United States Patent
Kudoh (10) Patent No.: US 8,061,909 B2
(45) Date of Patent: Nov. 22, 2011

(54) BARRIER DEVICE AND IMAGE PICKUP APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/687,688

(22) Filed: Jan. 14, 2010

(65) Prior Publication Data

US 2010/0183291 A1    Jul. 22, 2010

(30) Foreign Application Priority Data

Jan. 16, 2009 (JP) .................. 2009-007755

(51) Int. Cl.
 *G03B 17/00* (2006.01)
 *G03B 11/04* (2006.01)
 *G02B 23/16* (2006.01)
(52) U.S. Cl. ........................... 396/448; 359/511
(58) Field of Classification Search .................. 396/448; 359/511; 348/335
 See application file for complete search history.

(56) References Cited

U.S. PATENT DOCUMENTS

2008/0252975 A1 * 10/2008 Nishizawa .................... 359/511

FOREIGN PATENT DOCUMENTS

| JP | 07-159856 | 6/1995 |
| JP | 2007-102086 | 4/2007 |

* cited by examiner

*Primary Examiner* — Rochelle-Ann J Blackman
(74) *Attorney, Agent, or Firm* — Cowan, Liebowitz & Latman, P.C.

(57) ABSTRACT

A barrier device that is capable of being configured simply and thinly without enlarging an external diameter of an image pickup lens barrel even if an aperture in front of an image pickup lens is large. A pair of principal blade members that can open and close are arranged facing to the aperture. A plurality of pairs of auxiliary blade members are driven to open and close interlocked with open-close operations of the principal blade members. A pair of barrier driving springs are disposed between a barrier driving member that rotates around an optical axis of an image pickup optical system and the principal blade members, and to force to pull them each other in a direction to close the principal blade members. The open-close operations of the principal blade members are performed using spring forces of the barrier driving springs as the barrier driving member rotates.

6 Claims, 6 Drawing Sheets

BARRIER DEVICE AND IMAGE PICKUP APPARATUS

BACKGROUND OF THE INVENTION

1. Field of the Invention

The present invention relates to a barrier device provided in front of an image pickup optical system to protect an image pickup lens, and also relates to an image pickup apparatus having the barrier device.

2. Description of the Related Art

Generally an image pickup apparatus such as a digital camera is provided with a barrier mechanism in front of an image pickup lens barrel to protect an image pickup lens from dust invaded from the outside. This kind of barrier mechanism is disclosed in Japanese laid-open patent publication (Kokai) No. H7-159856 (JP H7-159856A), for example.

The barrier mechanism disclosed in the publication is provided with a pair of barrier blades, which can open and close an image pickup aperture of an image pickup optical system, in front of an image pickup lens barrel. The barrier blades are driven to open and close by a barrier drive ring that rotates around an optical axis. When closing the barrier blades, a rotation cylinder of the image pickup lens barrel is rotated in a clockwise direction. When a rotating force of the rotation cylinder is transmitted to the barrier drive ring via a connecting shaft, the barrier drive ring rotates in the clockwise direction while charging a barrier opening spring. At this time, the barrier drive ring pushes the barrier blades to rotate in a counterclockwise direction, which closes the barrier blades to cover the image pickup aperture in front of the image pickup optical system.

On the other hand, when opening the barrier blades, the rotation cylinder is rotated in the counterclockwise direction, which rotates the barrier drive ring in the counterclockwise direction. This releases a pressure to the barrier blades from the barrier drive ring, and the barrier blades rotate in the clockwise direction by a spring force of the charged barrier opening spring. This rotation opens the barrier blades, which opens the image pickup aperture in front of the image pickup optical system.

In recent years, a wide lens with a large effective optical path diameter is in increasing demand. The wide lens requires wide-area barrier blades in the barrier mechanism that uses the pair of barrier blades as shown in the above-mentioned publication. However, the larger the size of the barrier blades is, the larger the diameter of the image pickup lens barrel is in order to secure an escape space for the barrier blades when the barrier blades open.

Then, a method of increasing the number of the barrier blades is devised instead of enlarging the size of each barrier blade. For example, a barrier mechanism disclosed in Japanese laid-open patent publication (Kokai) No. 2007-102086 (JP2007-102086A) is provided with a first barrier blade group having three barrier blades that are rotatably supported by a pivot and a second barrier blade group that pairs off with the first barrier blade group and has three barrier blades similarly.

Each barrier blade group is provided with first and second springs, and one driving lever. The first spring gives a force in a direction to close the barrier blades and the second spring gives a force stronger than that of the first spring in a direction to open the barrier blades. The driving lever is driven by an external force to interrupt the spring force of the second spring to the barrier blades. When opening the barrier blades, the external force is not given to the driving lever. Accordingly, both the spring forces of the first and second springs are applied to the barrier blades. Since the spring force of the second spring is stronger than that of the first spring, the barrier blades open. When closing the barrier blades, the external force is given to the driving lever to interrupt the spring force of the second spring to the barrier blades. This closes the barrier blades by the spring force of the first spring.

However, since the barrier mechanism of the above-mentioned JP2007-102086A needs one driving lever and two springs for each barrier blade group, a component count increases, and the space therefor is also required.

SUMMARY OF THE INVENTION

The present invention provides a barrier device and an image pickup apparatus, which are capable of configuring the barrier device simply and thinly without enlarging an external diameter of an image pickup lens barrel even if an aperture in front of an image pickup lens is large.

Accordingly, a first aspect of the present invention provides a barrier device that is provided in front of an image pickup optical system to open and close an aperture of the image pickup optical system, comprising a pair of principal blade members adapted to be arranged facing to the aperture so as to be able to open and close, a plurality of pairs of auxiliary blade members adapted to be driven to open and close interlocked with open-close operations of the respective one pair of principal blade members, a barrier driving member adapted to rotate around an optical axis of the image pickup optical system in order to open and close the one pair of principal blade members, and a pair of barrier driving springs adapted to be disposed between the barrier driving member and the one pair of principal blade members, and to force the barrier driving member and the one pair of principal blade members to pull each other in a direction to close the principal blade members, wherein the open-close operations of the principal blade members are performed using spring forces of the barrier driving springs as the barrier driving member rotates.

Accordingly, a second aspect of the present invention provides an image pickup apparatus provided with the barrier device.

According to the present invention, the barrier device can be configured simply and thinly without enlarging the external diameter of the image pickup lens barrel even if the aperture in front of the image pickup lens is large.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

First, a configuration of a barrier mechanism that links with an image pickup lens barrel with which a digital camera, which is an example of an image pickup apparatus of the present invention, is equipped will be described with reference to FIG. 1 through FIG. 5.

Figure 1:
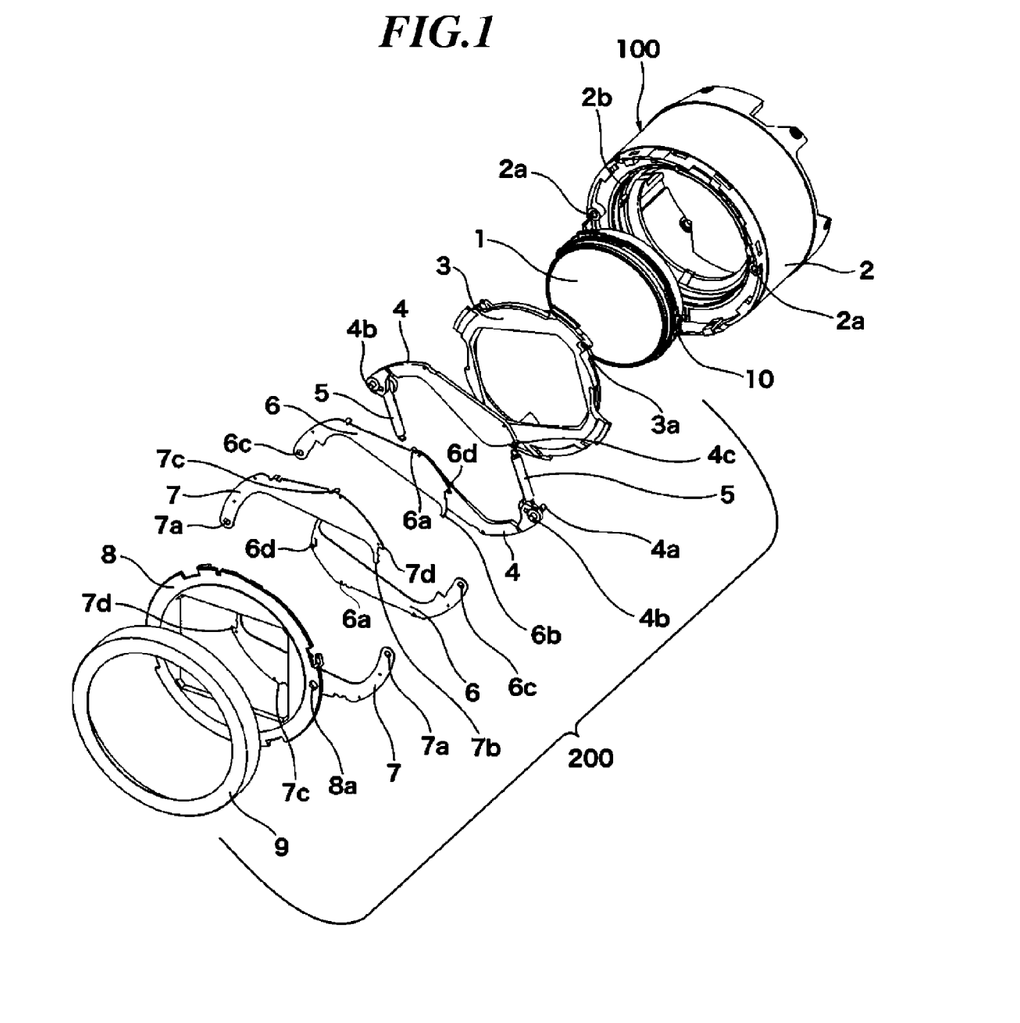
FIG. 1 is an exploded perspective view of a barrier mechanism according to an embodiment of the present invention.
Figure 2:
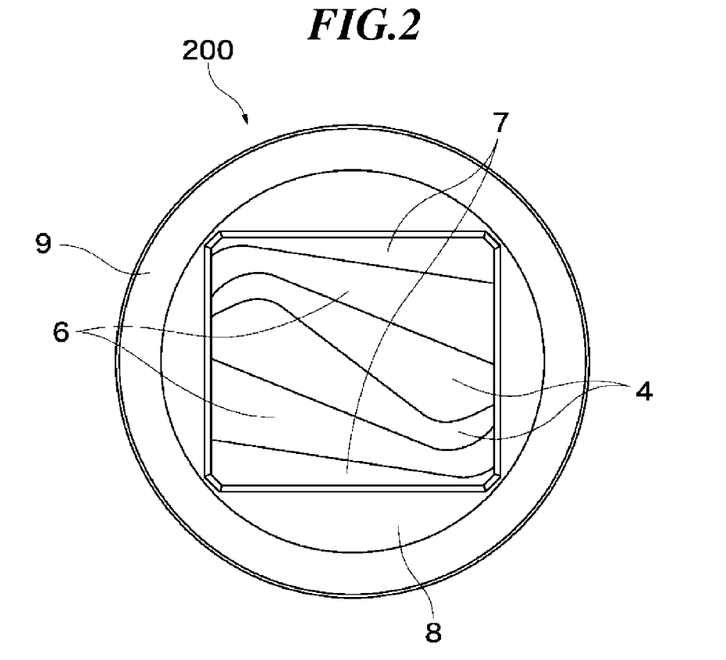
FIG. 2 is a front view of the barrier mechanism according to the embodiment in a closed state.
Figure 3:
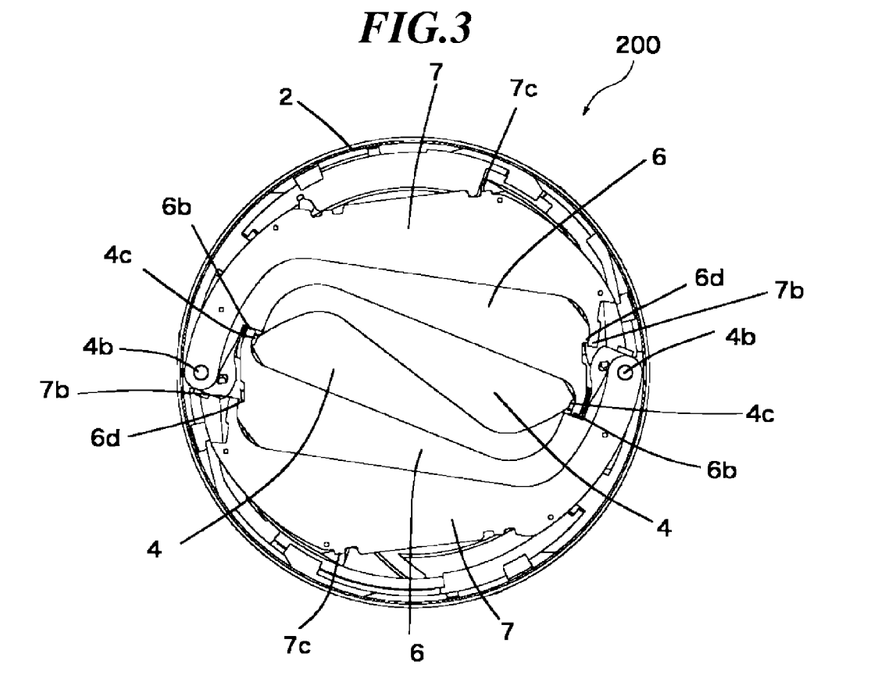
FIG. 3 is a front view showing an interior of the barrier mechanism according to the embodiment in the closed state.
Figure 4:
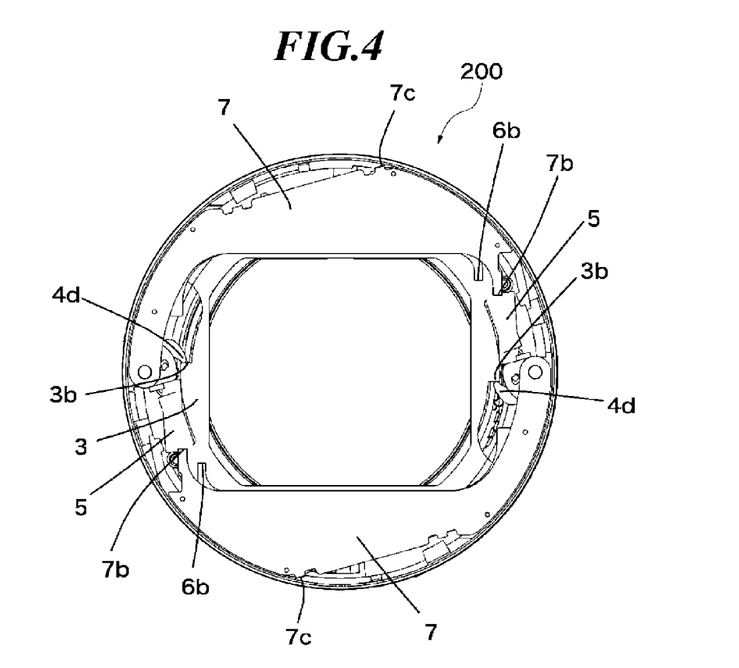
FIG. 4 is a front view showing interior of the barrier mechanism according to the embodiment in an opened state.
Figure 5:
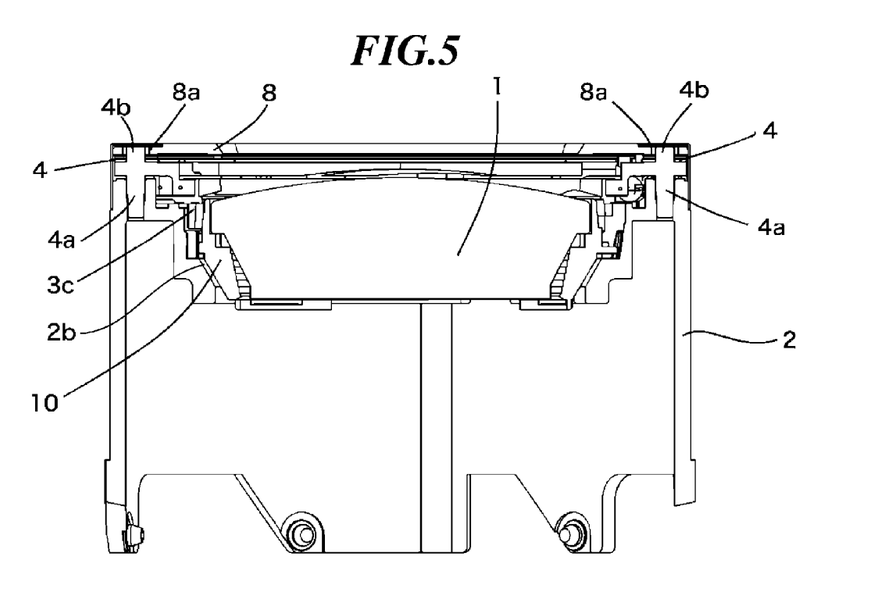
FIG. 5 is a sectional view of the barrier mechanism according to the embodiment.

FIG. 1 through FIG. 5 show the configuration of the barrier mechanism according to the embodiment of the present invention. FIG. 1 is an exploded perspective view of the barrier mechanism, FIG. 2 is a front view of the barrier mechanism in a closed state, FIG. 3 is a front view showing an interior of the barrier mechanism in the closed state, FIG. 4 is a front view showing the interior of the barrier mechanism in the opened state, and FIG. 5 is a sectional view of the barrier mechanism.

As shown in FIG. 1, an image pickup lens 1, which is installed in an image pickup lens barrel 100 as an image pickup optical system, is held by an image pickup lens holding member 10 in an outer circumference portion thereof, and is inserted into a lens holding member 2b having an aperture shape that is formed at a center of a base member 2. Here, the image pickup lens holding member 10 to hold the image pickup optical system is fixed by adhesion to the base member 2, which holds the whole barrier mechanism, at a rear position of the lens holding member 2b shown in FIG. 5. It should be noted that a subject side (a lower left side in FIG. 1 and an upper side in FIG. 5) in a direction of an optical axis of the image pickup lens 1 is defined as a front, and a camera side (a upper right side in FIG. 1 and a lower side in FIG. 5) is defined as a rear in this embodiment.

And a barrier mechanism 200, which comprises at least six pieces of blade members 4, 6, and 7 that can open and close, is supported in front of the image pickup lens 1 that is installed into the base member 2. The lens holding member 2b that holds the image pickup lens 1 is arranged on the base member 2 by which the whole barrier mechanism 200 is held. The lens holding member 2b is formed in a tapered shape, as shown in FIG. 5, and holds the image pickup lens holding member 10 in combination with a tapered unit, which is disposed on an outer circumference portion of the image pickup lens holding member 10.

Hereafter, a structure of the barrier mechanism 200 will be described in detail.

The barrier mechanism 200 of this embodiment is provided with a barrier driving member 3 rotated in order to open and close the blade members 4, 6, and 7 that act as one example of a barrier blade unit arranged in front of the image pickup lens. The one pair of principal blade members 4 and the plurality of auxiliary blade members, which include the first auxiliary blade member 6 and the second auxiliary blade member 7 corresponding to each of the principal blade members 4, are arranged in front of the barrier driving member 3 so that the blade members overlap in order.

An aperture is formed at the center of the barrier driving member 3 so as to avoid the image pickup lens 1. The barrier driving member 3 is set to the base member 2, and then is rotated. As a result, the barrier driving member 3 is fitted and fixed to the base member 2 so as not to disconnect. A rotary sliding member 3c (see FIG. 5) that functions as a fiducial point of the operation of the barrier driving member 3 is mounted on the barrier driving member 3. The rotary sliding member 3c, which is the center of rotation of the barrier driving member 3, is provided near the image pickup lens 1, and is arranged in front of the lens holding member 2b. According to such an arrangement, since the rotary sliding member 3c and the lens holding member 2b overlap one another in the direction orthogonal to the optical axis, and deviate in the direction of the optical axis, the addition of the rotary sliding member 3c does not enlarge the diameter of the image pickup lens barrel.

The principal blade member 4 is arranged so as to touch the barrier driving member 3. Two pieces of the principal blade members 4 are constituted so that they open and close in the same plane that is substantially orthogonal to the optical axis of the image pickup lens 1. Four pieces of the first and second auxiliary blade members 6 and 7 rotate around rotating shaft members 4b provided on the principal blade members 4. That is, the rotation of the barrier driving member 3 drives two pieces of the principal blade members 4, and the first and second auxiliary blade members 6 and 7 are driven interlocked with the operations of the principal blade members 4.

Principal blade rotation rods 4a formed on the pair of principal blade members 4 are inserted into barrier rotation holes 2a formed in the base member 2. Barrier driven members 4d provided on the principal blade members 4 can touch barrier interlocking members 3b provided on the barrier driving member 3.

Barrier driving springs 5 are disposed between the pair of the principal blade members 4 and spring holding members 3a provided on the barrier driving member 3. The barrier driving springs 5 force the principal blade members 4 and the spring holding members 3 to pull each other in a direction to close the principal blade members 4.

The rotating shaft members 4b are provided on direct backs of the principal blade rotation rods 4a of the principal blade members 4. The first auxiliary blade member 6 and the second auxiliary blade member 7 are attached to the rotating shaft member 4b so as to overlap in order. That is, the rotating shaft member 4b is inserted into a first shaft hole 6c formed on the first auxiliary blade member 6 and is also inserted into a second shaft hole 7a formed on the second auxiliary blade member 7.

A barrier cover member 8 that holds the barrier mechanism is mounted in front of the first and second auxiliary blade members 6 and 7. The rotating shaft members 4b are inserted into axial holes 8a provided on the barrier cover member 8. The barrier cover member 8 is fixed to the base member 2, and then, a barrier cap member 9 is attached thereon.

Thus, the rotating shaft members 4b are inserted into the axial holes 8a provided on the barrier cover member 8, and they are overlapped each other in the optical axis direction. This prevents the first and second auxiliary blade members 6 and 7 from dropping off from the rotating shaft members 4b even if the first and second auxiliary blade members 6 and 7 tilt or twist in a certain operation. Since the axial holes 8a are covered with the barrier cap member 9 from the outside, the axial holes 8 cannot be seen from the outside finally.

When the barrier mechanism performs a closing operation, the barrier driving member 3 rotates counterclockwise (the direction to increase the charging amount of the barrier driving spring 5) in FIG. 3 and FIG. 4 around the optical axis according to an external force from a driving mechanism (not shown) in the image pickup lens barrel 100, which rotates the principal blade members 4 clockwise around the principal blade rotating rods 4a via the barrier driving springs 5. First auxiliary blade closing interlocking members 4c formed at tips of the principal blade members 4 interlock first auxiliary blade closing interlocked members 6b formed at tips of the first auxiliary blade members 6 to rotate in the barrier closing direction. Second auxiliary blade closing interlocking members 6d formed at tips of the first auxiliary blade members 6 interlock second auxiliary blade closing interlocked members 7b formed at tips of the second auxiliary blade members 7 to rotate in the barrier closing direction. Thus, the rotating forces are transmitted to the blade members 4, 6, and 7 in order, and the barrier mechanism 200 will be in the closed state.

Even if the blade members 4, 6, and 7 are forcibly opened when the barrier mechanism 200 is in the closed state, the blade members 4, 6, and 7 return to the closed positions automatically because the blade members 4, 6, and 7 are forced in the closing direction by the spring force of the barrier driving springs 5. That is, when the blade member 4, 6, and 7 are opened under the condition where the barrier driving member 3 is set at the closed position, the charging amounts of the barrier driving springs 5 increase gradually according to the opening operation.

On the other hand, when the barrier mechanism 200 performs an opening operation, the barrier driving member 3 is released from the external force, and rotates clockwise (the direction to decrease the charging amount of the barrier driving spring) in a balance to the spring force of the barrier driving springs 5. The barrier interlocking members 3b of the barrier driving member 3 come into contact with the barrier driven members 4d provided on the principal blade members 4, and rotates the principal blade members 4 counterclockwise. A first auxiliary blade opening interlocked members 6a formed on the first auxiliary blade members 6 are pushed and opened by the sides of the principal blade members 4, and a second auxiliary blade opening interlocked members 7c formed on the second auxiliary blade members 7 are pushed and opened by the sides of the first auxiliary blade members 6. As a result, the blade members 4, 6, and 7 will be in the opened state. This time, the second blade opening interlocked members 7c come into contact with the base member 2, and function as mechanical stoppers.

During the closing operation of the barrier mechanism 200, the barrier driving member 3 moves to the closed position so that the blade members 4, 6, and 7 close the image pickup aperture. As the barrier driving member 3 moves from the closing position to the opening position to open the blade members 4, 6, and 7, the charging amount of the barrier driving spring 5 decreases gradually. If the barrier driving member 3 is moved to the closed position while keeping the blade members 4, 6, and 7 at the opened state by a finger, the charging amount of the barrier driving spring 5 increases gradually according to this movement.

The first auxiliary blade member 6 arranged immediately above the principal blade member 4 opens and closes interlocked with the open-close operation of the principal blade member 4. The second auxiliary blade member 7 arranged immediately above the first auxiliary blade member 6 opens and closes interlocked with the open-close operation of the first auxiliary blade member 6.

In this embodiment, the principal blade members 4 are made of resin, and the first and second auxiliary blade members are made of metal. This minimizes the thickness from the image pickup lens 1 to the front surface of the barrier cover member 8, which can make a camera thin. The first and second auxiliary blade members 6 and 7 can also be made of resin.

According to the embodiment, since the barrier mechanism that covers the front surface of the image pickup lens during disuse is configured as mentioned above, the mechanism can be configured simply with fewer component count than the conventional mechanism, and the external diameter of the image pickup lens barrel can be small even if the aperture in front of the image pickup lens is large. Further, the barrier mechanism with a thin thickness is achieved. Hereafter, the advantages of the barrier mechanism according to the embodiment will be described in detail.

(1) As mentioned above, the barrier mechanism of the embodiment has more than six pieces of the blade members 4, 6, and 7 at least, and the principal blade members 4 arranged directly on the barrier driving member 3 are engaged by shafts to the base member 2 used as a basis. On the principal blade members 4, the rotating shaft members 4b used as the rotation centers for the auxiliary blade members 6 and 7 are formed. And the springs 5 are disposed between the barrier driving members 3 and the principal blade members 4 to pull each other. During the closing operation of the barrier mechanism 200, the barrier driving member 3 is rotated counterclockwise by an external force to close the blade members 4, 6, and 7 via the springs 5. During the opening operation of the barrier mechanism 200, when the external force is released, the barrier driving member 3 rotates clockwise by the forces of the springs 5. The rotation force is directly transmitted to the blade members 4, 6, and 7 to open them. Accordingly, even if the aperture in front of the image pickup lens 1 is large, the barrier mechanism can be simply configured without enlarging the external diameter of the image pickup lens barrel 100 and without adding a spring or the like other than the springs 5.

(2) The barrier cover member 8 is arranged in front of the auxiliary blade members 6 and 7 of the barrier mechanism 200 according to the embodiment, the rotating shaft members 4b of the principal blade members 4 are inserted to and passed through the holes (the axial holes 8a) of the barrier cover member 8. This prevents the first and second auxiliary blade members 6 and 7 from dropping off from the rotating shaft members 4b, which can configure the stable barrier mechanism.

(3) Since the rotary sliding member 3c of the barrier driving member 3 and the lens holding member 2b overlap one another in the direction orthogonal to the optical axis, and deviate from each other in the direction of the optical axis, the barrier mechanism can be configured without enlarging the external diameter of the image pickup lens barrel 100.

(4) Since the first auxiliary blade members 6 operate interlocked with the open-close operations of the principal blade members 4 and the second auxiliary blade members 7 operate interlocked with the operation of the first auxiliary blade members 6, the barrier mechanism is operated certainly and the stable barrier mechanism can be configured.

Next, a configuration of a digital camera that is provided with the image pickup lens barrel 100 having the barrier mechanism 200 of the embodiment mentioned above will be described with reference to FIG. 6 through FIG. 8.

Figure 6:
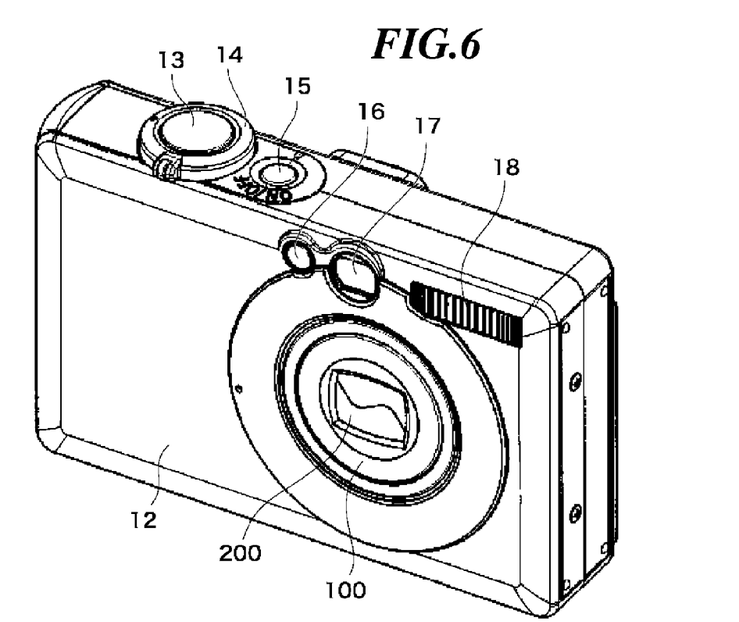
FIG. 6 is an external perspective view of a digital camera as an example of the image pickup apparatus according to the embodiment of the present invention.
Figure 7:
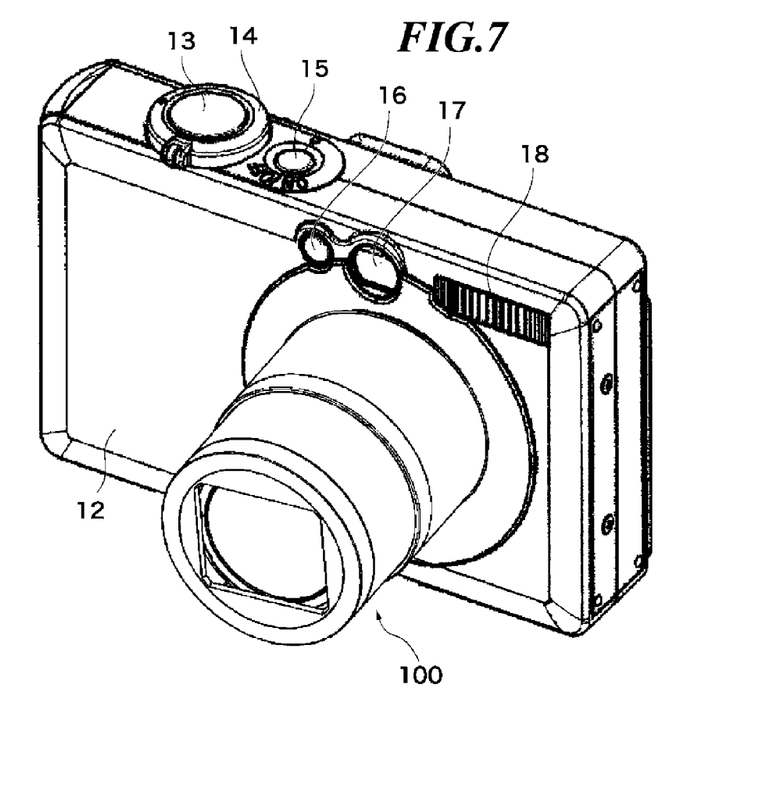
FIG. 7 is an external perspective view of the digital camera according to the embodiment.

FIG. 6 and FIG. 7 are external perspective views of the digital camera according to the embodiment, FIG. 6 shows a power OFF condition, and FIG. 7 shows a power ON condition.

As shown in FIG. 6 and FIG. 7, an auxiliary light emitting unit 16 that emits an auxiliary light for autofocusing when necessary, a finder 17 that is used to determine a composition of a subject, an electric flash 18, and the image pickup lens barrel 100 are mounted on a front panel of the digital camera 12 according to the embodiment. A release button 13, a zoom lever 14, and a power button 15 are arranged on an upper panel of the camera. On the back panel of the camera, an operation buttons that are used to change functions, a display that consists of an LCD, a finder eyepiece, etc. (not shown) are arranged.

Figure 8:
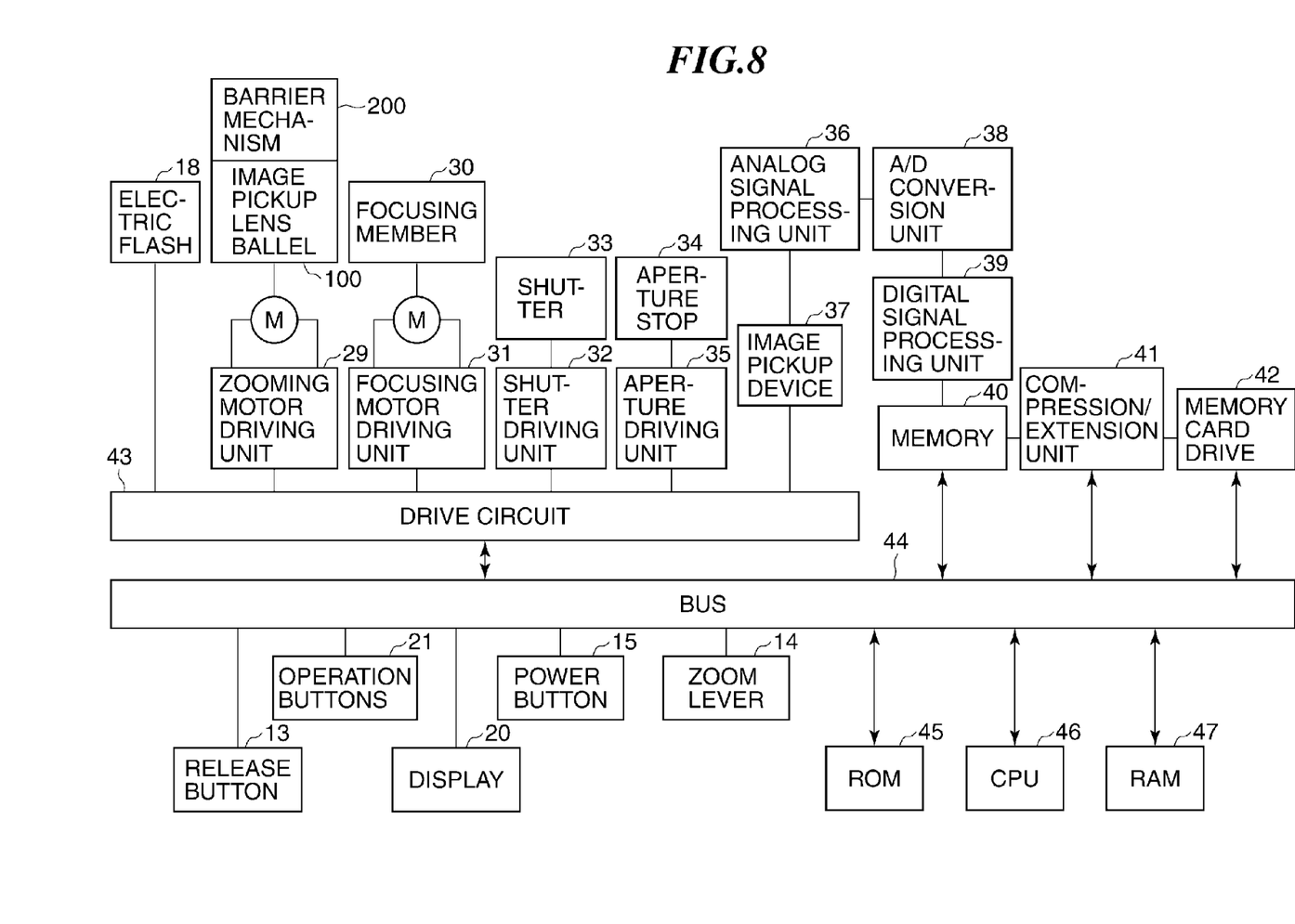
FIG. 8 is a block diagram schematically showing an electrical configuration of the digital camera according to the embodiment.

FIG. 8 is a block diagram schematically showing an electrical configuration of a main part of the digital camera according to the embodiment.

A control section of the digital camera 12 comprises a CPU 46, a ROM 45, and a RAM 47. The control section and various components such as the release button 13, the operation buttons 21, the display 20, a memory 40, and a memory card drive 42 are connected via a bus 44. A zooming motor driving unit 29, a focusing motor driving unit 31, a shutter driving unit 32, an aperture driving unit 35, an image pickup device 37 such as a CCD and a CMOS, and the electric flash 18 are connected to a drive circuit 43 that is connected with the control section via the bus 44. The drive circuit 43 controls the respective units based on signals from the CPU 46.

The program to control the above-mentioned functional constitution elements is stored in the ROM 45. Data required for each control program is stored in the RAM 47.

The digital camera 12 is constituted as mentioned above. When a user presses the power button 15 to power ON from OFF, the CPU 46 reads a necessary control program from the ROM 45, and starts an initial operation. That is, the image pickup lens barrel 100 is moved to a predetermined shooting possible region, a shooting function is started, and the camera is made into a shooting standby state.

When the release button 13 is pressed to take a picture, brightness of a subject is detected by the image capture device 37, and a photometry value is determined. An aperture value and a shutter speed are calculated based on the photometry value, and it is determined whether the electric flash 18 will be emitted or not, based on the photometry value. Next, a subject distance is measured, and the focusing motor driving unit 31 is driven based on the measured subject distance to move a focusing member 30 to a predetermined in-focus position.

Next, a shutter 33 is opened and closed to capture a desired image by the image capture device 37. Electrical charge corresponding to a light amount that incidents based on an exposure value is accumulated by the image capture device 37. The electrical charge is converted into an image signal, which is outputted to an analog signal processing unit 36. The analog signal processing unit 36 applies an analog process to the captured image data, and outputs to an A/D conversion unit 38. The A/D conversion unit 38 converts the received analog data into digital data. The digital data is outputted to a digital signal processing unit 39, and the digital data is processed here. Finally, the digital data is stored into the memory 40. A compression/extension unit 41 applies an expansion process to the image data stored in the memory 40 or the image data stored in the memory card drive 42, and the processed image data can be displayed on the display 20 via the bus 44.

When the zoom lever 14 is operated, the zooming motor driving unit 29 is controlled via the drive circuit 43, which moves the image pickup lens barrel 100 in the optical axis direction to change a focal length.

Next, a process from the power ON to the end of shooting will be described with reference to FIG. 9.

Figure 9:
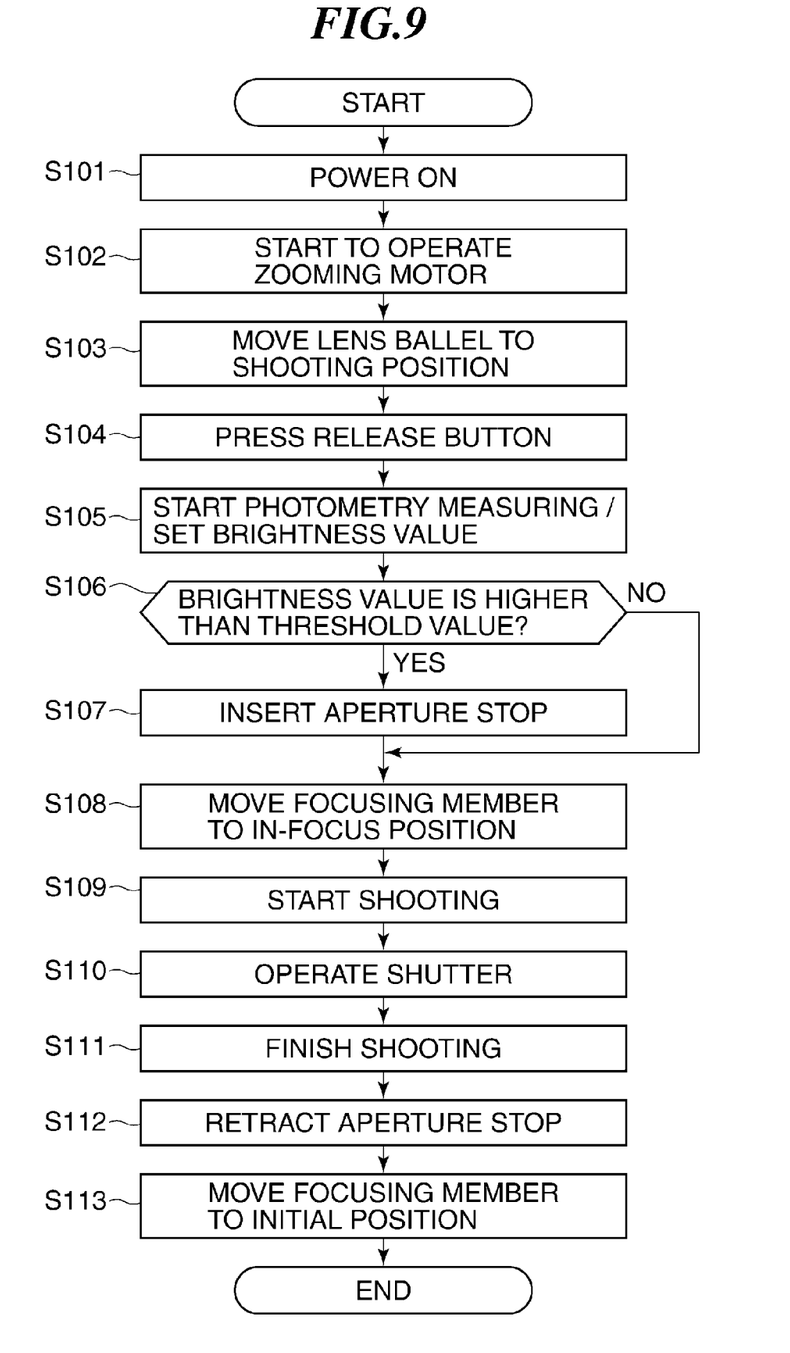
FIG. 9 is a flowchart showing a process of the digital camera according to the embodiment from power-on to an end of shooting.

FIG. 9 is a flowchart showing a process of the digital camera according to the embodiment from the power ON to the end of shooting.

When a user turns on the power of the digital camera (step S101), the CPU 46 sends an instruction to the zooming motor driving unit 29 to rotate a zooming motor clockwise (step S102). After performing a predetermined operation, when it is determined that the image pickup lens barrel 100 has moved to a shooting position (step S103), the zooming motor stops. At this time, the image pickup lens barrel 100 moves from the position of FIG. 6 to the position of FIG. 7.

Next, when the user presses the release button 13 (step S104), the photometry measuring is performed to acquire a brightness value about the subject (step S105). When the acquired brightness value is higher than a predetermined threshold value (YES in step S106), an aperture stop 34 is inserted in the optical path to reduce the incident light amount (step S107). When the acquired brightness value is lower than the predetermined threshold value (NO in the step S106), the aperture stop 34 is not actuated to keep a condition to be retracted from the optical path.

After that, the focusing member 30 moves to the in-focus position to the subject (step S108), and then, an shooting starts (step S109). Next, the shutter 33 is operated to open and close (step S110), and the shooting is finished (step S111). Then, the aperture stop 34 is retracted from the optical path (step S112), the focusing member 30 is moved to an initial position, and the operation is finished (step S113).

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-007775, filed on Jan. 16, 2009, which is hereby incorporated by reference herein in its entirety.

What is claimed is:

1. A barrier device that is provided in front of an image pickup optical system to open and close an aperture of the image pickup optical system, comprising:
   a pair of principal blade members adapted to be arranged facing each other so as to be able to open and close;
   a plurality of pairs of auxiliary blade members adapted to be driven to open and close interlocked with open-close operations of said respective one pair of principal blade members;
   a barrier driving member adapted to rotate around an optical axis of the image pickup optical system in order to open and close said one pair of principal blade members; and
   a pair of barrier driving springs adapted to be disposed between said barrier driving member and said respective one pair of principal blade members, and to force said barrier driving member and said respective one pair of principal blade members to pull each other in a direction to close said principal blade members,
   wherein the open-close operations of said principal blade members are performed using spring forces of said barrier driving springs as said barrier driving member rotates.

2. The barrier device according to claim 1, wherein said barrier driving member is rotated by an external force in a direction to increase a charging amount of said barrier driving springs to close said one pair of principal blade members via said barrier driving springs during a closing operation, and
   wherein the external force is released, said barrier driving member is rotated in a direction to decrease the charging amount of said barrier driving springs by forces of said barrier driving springs, and the rotating force is transmitted to said one pair of principal blade members to open said one pair of principal blade members during an opening operation.

3. The barrier device according to claim 1, further comprising:
   a barrier cover member adapted to be arranged in front of said plurality of pairs of auxiliary blade members to hold the barrier device,
   wherein said plurality of pairs of auxiliary blade members rotate around rotating shaft members provided on said respective principal blade members, and the rotating shaft members are inserted to axial holes formed on said barrier cover member.

4. The barrier device according to claim 1, wherein said barrier driving member has a rotary sliding member that functions as a fiducial point of the operation of said barrier driving member, and
   wherein the rotary sliding member is arranged so that the rotary sliding member and a lens holding member to hold the image pickup optical system provided on a base member that holds the entire barrier device overlap one another in the direction orthogonal to the optical axis, and deviate from each other in the direction of the optical axis.

5. The barrier device according to claim 1, wherein said plurality of pairs of auxiliary blade members comprise first auxiliary blade members arranged immediately above said respective one pair of principal blade members and second auxiliary blade members arranged immediately above the respective first auxiliary blade members, and
   wherein the first auxiliary blade members are driven to open and close interlocked with the open-close operations of said principal blade members, and the second auxiliary blade members are driven to open and close interlocked with open-close operations of the first auxiliary blade members.

6. An image pickup apparatus provided with the barrier device according to claim 1.

* * * * *